(12) United States Patent
Kunz (10) Patent No.: US 7,352,701 B1
(45) Date of Patent: Apr. 1, 2008

(54) BUFFER TO BUFFER CREDIT RECOVERY FOR IN-LINE FIBRE CHANNEL CREDIT EXTENSION DEVICES

(75) Inventor: James A. Kunz, Plymouth, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 895 days.

(21) Appl. No.: 10/664,548

(22) Filed: Sep. 19, 2003

(51) Int. Cl.
*H04L 12/26* (2006.01)
(52) U.S. Cl. ....................... 370/235; 370/412
(58) Field of Classification Search ............. 370/412, 370/235.1, 235
See application file for complete search history.

(56) References Cited

U.S. PATENT DOCUMENTS

| | | | |
|---|---|---|---|
| 4,162,375 A | 7/1979 | Schilichte | 179/15 |
| 4,200,929 A | 4/1980 | Davidjuk et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 340/825 |
| 4,980,857 A | 12/1990 | Walter et al. | |
| 5,051,742 A | 9/1991 | Hullett et al. | |
| 5,115,430 A | 5/1992 | Hahne et al. | |
| 5,144,622 A | 9/1992 | Takiyasu et al. | 370/85.13 |
| 5,260,933 A | 11/1993 | Rouse | |
| 5,367,520 A | 11/1994 | Cordell | 370/60 |
| 5,590,125 A | 12/1996 | Acampora et al. | |
| 5,598,541 A | 1/1997 | Malladi | 395/286 |
| 5,610,745 A | 3/1997 | Bennett | 359/139 |
| 5,666,483 A | 9/1997 | McClary | |

(Continued)

FOREIGN PATENT DOCUMENTS

EP      0649098      9/1994

(Continued)

OTHER PUBLICATIONS

Banks, David C., et al., "Link Trunking and Measuring Link Latency in Fibre Channel Fabric", *Provisional U.S. Appl. No. 60/286,046*, 1-52.

(Continued)

*Primary Examiner*—Brian Nguyen
(74) *Attorney, Agent, or Firm*—Klein, O'Neill & Singh, LLP (57) ABSTRACT

A method and system for credit recovery of lost frames and R_RDYs in an in-line credit extender is provided. The method includes, comparing received frame count and a programmable counter value when BB_SCs are received; loading the difference between the frame count and the programmed counter value into a buffer and to a first counter that counts each frame that is transmitted; and sending BB-SCs to the local device if there is a match between the first counter value and a second programmable counter value. The method also includes, counting received R_RDYs, wherein a first counter counts the received R_RDYs; setting a flag when a BB_SCr is received; and transmitting BB-SCr when the first counter value is zero and the flag is set. Also, R_RDYs received after BB_SCrs are counted by a second counter and transmitted when the second counter value is non-zero.

23 Claims, 6 Drawing Sheets

U.S. PATENT DOCUMENTS

| | | | |
|---|---|---|---|
| 5,687,172 A | 11/1997 | Cloonan et al. | 370/395 |
| 5,748,612 A | 5/1998 | Stoevhase et al. | 370/230 |
| 5,818,842 A | 10/1998 | Burwell et al. | 370/397 |
| 5,821,875 A | 10/1998 | Lee et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,894,560 A | 4/1999 | Carmichael et al. | |
| 5,954,796 A | 9/1999 | McCarty et al. | |
| 5,987,028 A | 11/1999 | Yang et al. | 370/380 |
| 5,999,528 A | 12/1999 | Chow et al. | 370/365 |
| 6,014,383 A | 1/2000 | McCarty | 370/453 |
| 6,021,128 A | 2/2000 | Hosoya et al. | 370/380 |
| 6,031,842 A | 2/2000 | Trevitt et al. | |
| 6,047,323 A | 4/2000 | Krause | 709/227 |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,128,292 A | 10/2000 | Kim et al. | 370/356 |
| 6,144,668 A | 11/2000 | Bass et al. | |
| 6,160,813 A | 12/2000 | Banks et al. | 370/422 |
| 6,201,787 B1 | 3/2001 | Baldwin et al. | |
| 6,229,822 B1 | 5/2001 | Chow et al. | |
| 6,240,096 B1 | 5/2001 | Book | |
| 6,253,267 B1 | 6/2001 | Kim et al. | |
| 6,289,002 B1 | 9/2001 | Henson et al. | |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,343,324 B1 | 1/2002 | Hubis et al. | |
| 6,353,612 B1 | 3/2002 | Zhu et al. | |
| 6,370,605 B1 | 4/2002 | Chong | |
| 6,401,128 B1 | 6/2002 | Stai et al. | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,711 B1 | 7/2002 | Blumenau et al. | |
| 6,424,658 B1 | 7/2002 | Mathur | 370/429 |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,470,026 B1 | 10/2002 | Pearson et al. | |
| 6,532,212 B1 | 3/2003 | Soloway et al. | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,614,796 B1 | 9/2003 | Black et al. | |
| 6,697,359 B1 | 2/2004 | George | 370/357 |
| 6,697,368 B2 | 2/2004 | Chang et al. | |
| 6,718,497 B1 | 4/2004 | Whitby-Strevens | |
| 6,744,772 B1 | 6/2004 | Eneboe et al. | |
| 6,760,302 B1 | 7/2004 | Ellinas et al. | |
| 6,785,241 B1 * | 8/2004 | Lu et al. | 370/241 |
| 6,807,181 B1 | 10/2004 | Weschler | |
| 6,816,750 B1 | 11/2004 | Klaas | |
| 6,859,435 B1 | 2/2005 | Lee et al. | |
| 6,865,157 B1 | 3/2005 | Scott et al. | |
| 6,886,141 B1 | 4/2005 | Kunz et al. | |
| 6,941,357 B2 | 9/2005 | Nguyen et al. | |
| 6,941,482 B2 | 9/2005 | Strong | |
| 6,952,659 B2 | 10/2005 | King et al. | |
| 6,968,463 B2 | 11/2005 | Pherson et al. | |
| 7,000,025 B1 | 2/2006 | Wilson | |
| 7,002,926 B1 | 2/2006 | Eneboe et al. | |
| 7,010,607 B1 | 3/2006 | Bunton | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,055,068 B2 | 5/2006 | Riedl | |
| 7,061,871 B2 | 6/2006 | Sheldon et al. | |
| 7,092,374 B1 | 8/2006 | Gubbi | |
| 7,110,394 B1 | 9/2006 | Chamdani et al. | |
| 7,124,169 B2 | 10/2006 | Shimozono et al. | |
| 7,151,778 B2 | 12/2006 | Zhu et al. | |
| 7,171,050 B2 | 1/2007 | Kim | |
| 7,185,062 B2 | 2/2007 | Lolayekar et al. | |
| 7,188,364 B2 | 3/2007 | Volpano | |
| 7,190,667 B2 | 3/2007 | Susnow et al. | |
| 7,194,538 B1 | 3/2007 | Rabe et al. | |
| 7,200,108 B2 | 4/2007 | Beer et al. | |
| 7,215,680 B2 | 5/2007 | Mullendore et al. | |
| 7,221,650 B1 | 5/2007 | Cooper et al. | |
| 7,245,613 B1 | 7/2007 | Winkles et al. | |
| 7,248,580 B2 | 7/2007 | George et al. | |
| 7,269,131 B2 | 9/2007 | Cashman et al. | |
| 7,292,593 B1 | 11/2007 | Winkles et al. | |
| 2001/0011357 A1 | 8/2001 | Mori | |
| 2001/0038628 A1 | 11/2001 | Ofek et al. | 370/392 |
| 2002/0034178 A1 | 3/2002 | Schmidt et al. | |
| 2002/0071387 A1 | 6/2002 | Horiguchi et al. | |
| 2002/0103913 A1 | 8/2002 | Tawil et al. | |
| 2002/0104039 A1 | 8/2002 | DeRolf et al. | |
| 2002/0124124 A1 | 9/2002 | Matsumoto et al. | |
| 2002/0147560 A1 | 10/2002 | Devins et al. | |
| 2002/0147843 A1 | 10/2002 | Rao | |
| 2002/0156918 A1 | 10/2002 | Valdevit et al. | |
| 2002/0172195 A1 | 11/2002 | Pekkala et al. | |
| 2002/0191602 A1 | 12/2002 | Woodring et al. | |
| 2002/0196773 A1 | 12/2002 | Berman | |
| 2003/0016683 A1 | 1/2003 | George et al. | |
| 2003/0021239 A1 | 1/2003 | Mullendore et al. | |
| 2003/0026267 A1 | 2/2003 | Oberman et al. | |
| 2003/0026287 A1 | 2/2003 | Mullendore et al. | |
| 2003/0035433 A1 | 2/2003 | Craddock et al. | |
| 2003/0046396 A1 | 3/2003 | Richter et al. | |
| 2003/0056000 A1 | 3/2003 | Mullendore et al. | |
| 2003/0072316 A1 | 4/2003 | Niu et al. | |
| 2003/0079019 A1 | 4/2003 | Lolayekar et al. | |
| 2003/0084219 A1 | 5/2003 | Yao et al. | |
| 2003/0086377 A1 | 5/2003 | Berman | |
| 2003/0091062 A1 | 5/2003 | Lay et al. | |
| 2003/0103451 A1 | 6/2003 | Lutgen et al. | |
| 2003/0117961 A1 | 6/2003 | Chuah et al. | |
| 2003/0120983 A1 | 6/2003 | Vieregge et al. | |
| 2003/0126223 A1 | 7/2003 | Jenne et al. | |
| 2003/0137941 A1 | 7/2003 | Kaushik et al. | |
| 2003/0174789 A1 | 9/2003 | Waschura et al. | |
| 2003/0179709 A1 | 9/2003 | Huff | |
| 2003/0179748 A1 | 9/2003 | George et al. | 370/389 |
| 2003/0189930 A1 | 10/2003 | Terrell et al. | |
| 2003/0189935 A1 | 10/2003 | Warden et al. | |
| 2003/0195983 A1 | 10/2003 | Krause | |
| 2003/0229808 A1 | 12/2003 | Heintz et al. | |
| 2003/0236953 A1 | 12/2003 | Grieff et al. | |
| 2004/0013092 A1 | 1/2004 | Betker et al. | |
| 2004/0013125 A1 | 1/2004 | Betker et al. | |
| 2004/0015638 A1 | 1/2004 | Bryn | |
| 2004/0024831 A1 | 2/2004 | Yang et al. | |
| 2004/0028038 A1 | 2/2004 | Anderson et al. | |
| 2004/0057389 A1 | 3/2004 | Klotz et al. | |
| 2004/0081186 A1 | 4/2004 | Warren et al. | |
| 2004/0081394 A1 | 4/2004 | Biren et al. | |
| 2004/0085955 A1 | 5/2004 | Walter et al. | |
| 2004/0100944 A1 | 5/2004 | Richmond et al. | |
| 2004/0109418 A1 | 6/2004 | Fedorkow et al. | |
| 2004/0123181 A1 | 6/2004 | Moon et al. | |
| 2004/0141521 A1 | 7/2004 | George | 370/463 |
| 2004/0151188 A1 | 8/2004 | Maveli et al. | |

| | | |
|---|---|---|
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0047852 A1 | 3/2006 | Shah et al. |
| 2006/0074927 A1 | 4/2006 | Sullivan et al. |
| 2006/0184711 A1 | 8/2006 | Pettey |

FOREIGN PATENT DOCUMENTS

| | | |
|---|---|---|
| EP | 0856969 | 1/1998 |
| WO | WO-98/36537 | 8/1998 |
| WO | WO03/088050 | 10/2003 |

OTHER PUBLICATIONS

Brown, Douglas W., "A State-Machine Synthesizer", *18th Design Automation Conference*, (1981), 301-305.

Curtis, A. R., "Design Considerations for 10-Gbit Fibre Channel", *Curtis A. Ridgeway, Distinguished I/O Architect, Storage and Computing ASIC's Division, LSI Logic Corp.*

Malavalli, Kumar, "High Speed Fibre Channel Switching Fabric Devices", *Proceedings of the SPIE, SPIE, Bellingham, VA, USA vol. 1577.*, XP000562869, ISSN: 0277-786X, (Sep. 4, 1991), 216-226.

Melhem, et al., "Minimizing Wavelength Conversions in WDM Path Establishment", *Computer Science Department, University of Pittsburgh, Pittsburgh, PA 15260*, (2001), 197-211.

Ridgeway, Curt , "0GFC-40GFC using 4-lane XAUI's", *LSI Logic Presentation—T11/03-069v0*.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

"Examination Report from the European Patent Office dated Oct. 12, 2007 for European Application No. 05 805 632.6".

Malavalli, et al., "Fibre Channel Framing and Signaling (FC-FS) REV 1.10", *NCITS working draft proposed American National Standard for Information Technology*, (Jan. 25, 2001).

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated Oct. 23, 2007 for U.S. Appl. No. 10/894,597".

"Office Action from USPTO dated Oct. 25, 2007 for U.S. Appl. No. 10/894,579".

"Office Action from USPTO dated Oct. 11, 2007 for U.S. Appl. No. 10/894,629".

"Office Action from USPTO dated Oct. 25, 2007 for U.S. Appl. No. 10/894,536".

"Office Action from USPTO dated Nov. 13, 2007 for U.S. Appl. No. 10/894,586".

"Office Action from USPTO dated Oct. 17, 2007 for U.S. Appl. No. 10/894,917".

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Office Action from USPTO dated Jun. 28, 2007 for U.S. Appl. No. 10/894,529".

"Office Action from USPTO dated Sep. 14, 2007 for U.S. Appl. No. 10/894,978".

"Office Action from USPTO dated Apr. 6, 2007 for U.S. Appl. No. 10/956,718".

"Office Action from USPTO dated Oct. 3, 2007 for U.S. Appl. No. 10/956,717".

"Office Action from USPTO dated Jun. 1, 2007 for U.S. Appl. No. 10/961,463".

"Office Action from USPTO dated May 21, 2007 for U.S. Appl. No. 10/212,425".

"Office Action from USPTO dated Oct. 18, 2006 for U.S. Appl. No. 10/241,153".

"Office Action from USPTO dated Apr. 3, 2007 for U.S. Appl. No. 10/241,153".

"Office Action from USPTO dated Nov. 16, 2007 for U.S. Appl. No. 10/241,153".

"Office Action from USPTO dated Nov. 15, 2006 for U.S. Appl. No. 10/263,858".

"Office Action from USPTO dated Jul. 11, 2007 for U.S. Appl. No. 10/263,858".

"Office Action from USPTO dated Jan. 19, 2007 for U.S. Appl. No. 10/302,149".

"Office Action from USPTO dated Aug. 20, 2007 for U.S. Appl. No. 10/302,149".

"Office Action from USPTO dated Sep. 20, 2007 for U.S. Appl. No. 10/798,527".

"Office Action from USPTO dated Sep. 20, 2007 for U.S. Appl. No. 10/889,267".

"Office Action from USPTO dated Sep. 6, 2007 for U.S. Appl. No. 10/889,337".

"Office Action from USPTO dated Aug. 31, 2007 for U.S. Appl. No. 10/889,635".

"Office Action from USPTO dated Mar. 21, 2006 for U.S. Appl. No. 10/889,588".

"Office Action from USPTO dated Sep. 10, 2007 for U.S. Appl. No. 10/889,255".

"Office Action from USPTO dated Sep. 4, 2007 for U.S. Appl. No. 10/889,551".

"Office Action from USPTO dated Sep. 20, 2007 for U.S. Appl. No. 10/889,259".

"Office Action from USPTO dated Sep. 19, 2007 for U.S. Appl. No. 10/894,492".

"Office Action from USPTO dated Oct. 4, 2007 for U.S. Appl. No. 10/894,627".

"Office Action from USPTO dated Oct. 25, 2007 for U.S. Appl. No. 10/894,491".

\* cited by examiner

BUFFER TO BUFFER CREDIT RECOVERY FOR IN-LINE FIBRE CHANNEL CREDIT EXTENSION DEVICES

BACKGROUND

1. Field of the Invention

The present invention relates to fibre channel systems, and more particularly, to in-line buffer to buffer credit recovery.

2. Background of the Invention

Computer networks are used in every facet of modern life. These networks use high performance switching and data handling systems. Interconnected computers and high performance storage devices are commonly used. A switch is a network device at a node that sends and receives data across the network in units of frames. Various standards are used in these networks, for example, the Fibre Channel standard.

Fibre channel is a set of American National Standard Institute (ANSI) standards which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

In Fibre Channel, buffer to buffer credit mechanism is used to control frame flow on a Fibre Channel link to prevent the inability to deliver any frames because of lost R_RDYs or lost frames. Fibre Channel point-to-point links lose credit when an R_RDY or an SOFx (Start Of Frame) is corrupted in transit. As credit is lost, performance degrades until frame timeouts occur. Then the only recourse is to reset the link.

The Fibre Channel standard has a credit recovery mechanism for lost R_RDYs or lost frames. Both ports on the link must support the Fibre Channel credit recovery before it can be enabled.

Fibre Channel credit recovery is used for point to point links (including links from end-user devices to switches).

Fibre Channel credit recovery defines a BB_SC_N number from 0 to 15 and two primitive signals, BB_SCr and BB_SCs. When BB_SC_N is not zero, credit recovery is enabled. Two credit recovery operations are used, one for lost frame(s) and another for lost R_RDY(s).

For lost frame(s) credit recovery, BB_SCs is transmitted whenever $2**BB\_SC\_N$ frames have been transmitted since the last BB_SCs was transmitted. The receiving port counts the number of frames received between BB_SCs primitive signals received and if the number is less than $2*BB\_SC\_N$, it transmits as many R_RDYs as frames were lost back to the originator of the frames. Thus the originator does not lose credit for transmitting more frames.

For lost R_RDY(s) credit recovery, BB_SCr is transmitted whenever $2**BB\_SC\_N$ R_RDYs have been transmitted since the last BB_SCr was transmitted. The receiving port counts the number of R_RDYs received between BB_SCr primitive signals received and if the number is less than $2*BB\_SC\_N$, it adds the lost number of credits to its credit counter. Thus the receiver does not lose credit for transmitting more frames.

Most FC switches have approximately 8-323 credits per fabric, which meets the requirements for shortwave links. However, the demand for longer links is increasing as networks are being spread globally.

A fibre channel credit extender is very desirable for long range communication. Typically, this extender is placed between an end node and an optical repeater.

Conventional credit extenders do not accurately maintain buffer to buffer recovery information between its input and output interface as described above. This can result in disruption of network traffic.

Therefore, what is required is a process and system that efficiently maintains buffer to buffer recovery information in credit extenders.

SUMMARY OF THE INVENTION

In one aspect of the present invention, a method for credit recovery of lost frames in an in-line credit extender coupled between a remote device and a local device is provided. The method includes, comparing received frame count and a first programmed counter value when BB-SCs are received; loading the difference between the programmed counter value and the received frame count into a buffer and to a first counter that counts each frame that is transmitted; and sending BB-SCs to the local device if there is a match between the first counter value and a second programmed counter value.

The first and the second programmed counter values are the same. The number of buffer credits lost are determined by the difference between the first or second programmed counter value and the received frame count.

In yet another aspect of the present invention, a system for credit recovery of lost frames in an in-line credit extender coupled between a remote device and a local device is provided. The system includes, a first counter for counting received frames; a first programmable counter that is programmed with a value; a comparator for comparing the first counter and the first programmable counter value when BB_SCs are received; and a second counter for counting transmitted frames.

The system also includes, a second programmable counter whose value is compared to the second counter and if there is a match between the two values, BB-SCs are sent to the local device.

In yet another aspect, a method for credit recovery of lost R_RDYs in an in-line credit extender coupled between a remote device and a local device is provided. The system includes, counting received R_RDYs, wherein a first counter counts the received R_RDYs; setting a flag when a BB_SCr is received; and transmitting BB-SCr when the first counter value is zero and the flag is set.

The method also includes, counting R_RDYs after BB_SCrs are received, wherein a second counter counts the R_RDYs; and transmitting R_RDYs when the second counter value is non-zero.

The first counter value is decreased everytime an R_RDY is transmitted and the flag is cleared after a BB_SCr is transmitted. Also, the second counter is decremented everytime an R_RDY is transmitted.

In yet another aspect of the present invention, a system for credit recovery of lost R_RDYs in an in-line credit extender coupled between a remote device and a local device is provided. The system includes, a first counter for counting received R_RDYs; a second counter for counting R_RDYs received after BB_SCrs are received; and a R_RDY control module that transmits R_RDYs when the first counter value is non-zero.

The system also includes, a register that sets a flag when a BB_SCr is received; and a BB-SCr control module that transmits BB_SCrs when the first or second counter value is zero.

In one aspect of the present invention, the local device is in sync with the remote device, and credit management occurs efficiently.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

The following definitions are provided as they are typically (but not exclusively) used in the fibre channel environment, implementing the various adaptive aspects of the present invention.

"BB_SCs": Flow control primitive signal used for credit recovery involving lost frames.

"BB_SCr": Flow control primitive signal used for credit recovery of lost R_RDYs.

"E-Port": A fabric expansion port that attaches to another Interconnect port to create an Inter-Switch Link.

"F-Port": A port to which non-loop N_Ports are attached to a fabric.

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Inter-Switch Link": A Link directly connecting the E_port of one switch to the E_port of another switch.

Port: A general reference to N. Sub.--Port or F.Sub.--Port.

"N-Port": A direct fabric attached port.

"R_RDY": Flow control primitive signal used for establishing credit. Receiving an R_RDY increases credit, while sending an R_RDY decreases credit.

"Switch": A fabric element conforming to the Fibre Channel Switch standards.

To facilitate an understanding of the preferred embodiment, the general architecture and operation of a fibre channel system will be described. The specific architecture and operation of the preferred embodiment will then be described with reference to the general architecture of the fibre channel system.

Figure 1:
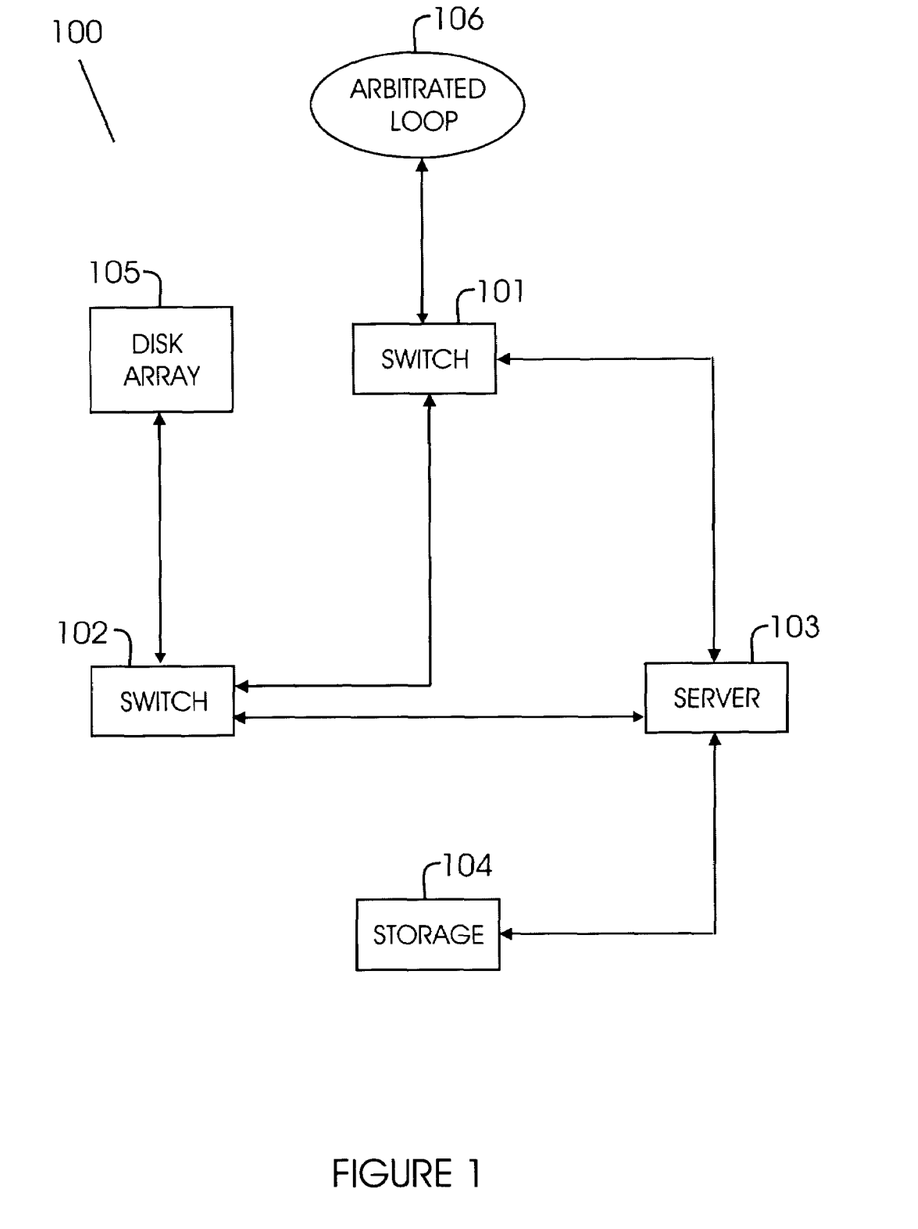
FIG. 1 is a block diagram of a fibre channel network system.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports.

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Figure 2:
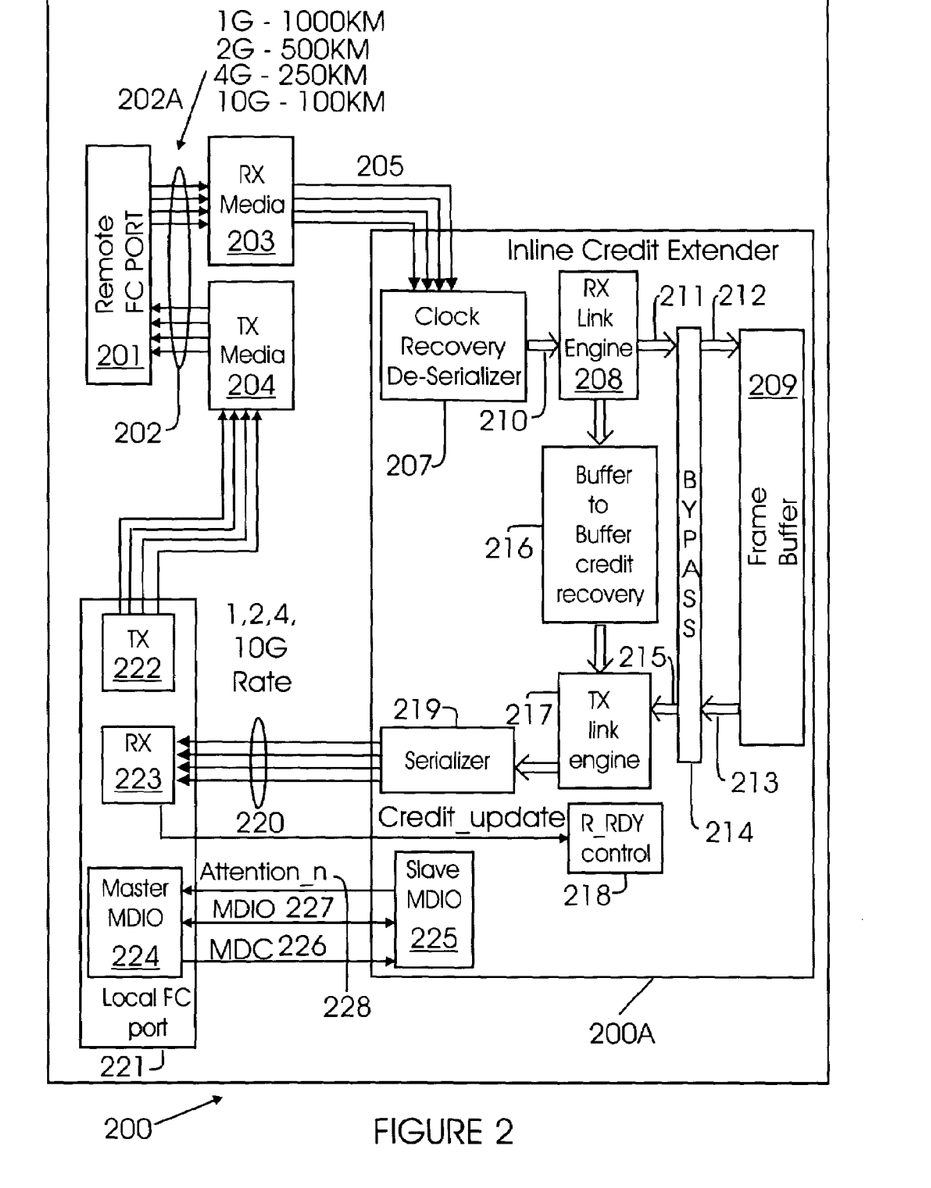
FIG. 2 is a block diagram showing a fibre channel extender between a local device and a remote device, according to one aspect of the present invention.

FIG. 2 shows a block diagram of a system 200, according to the present invention, using the various adaptive aspects of the present invention. A remote device 201 sends data via an optical converter 203 to credit extender 200A. A clock recovery/deserialzer module 207 processes incoming data. De-serialized data 210 is then sent to a receive (Rx) link engine 208 and then sent to a frame buffer 209.

Credit extender 200A is also coupled to a local device 221. This may be a host bus adapter or a switch port. When data has to be sent by credit extender 200A, it is serialized by serializer 219 and sent to the Rx buffer 223 at device 221.

Remote device 201, credit extender 200A and local device 221 must be in sync when it comes to buffer credit management. Sometimes, credit is lost in long-range communication between devices. Credit can be lost on both receive and transmit sides, i.e., between remote device 201 and credit extender 200A, and between local device 221 and credit extender 200A.

In one aspect of the present invention, the buffer to buffer credit recovery mechanism uses BB_SCs and BB_SCr primitive signals to recover lost credit. BB_SCs are sent by a remote device after certain number of frames have been transmitted. BB_SCr is a primitive that is sent out after a certain number of R_RDYs have been transmitted.

Figure 3:
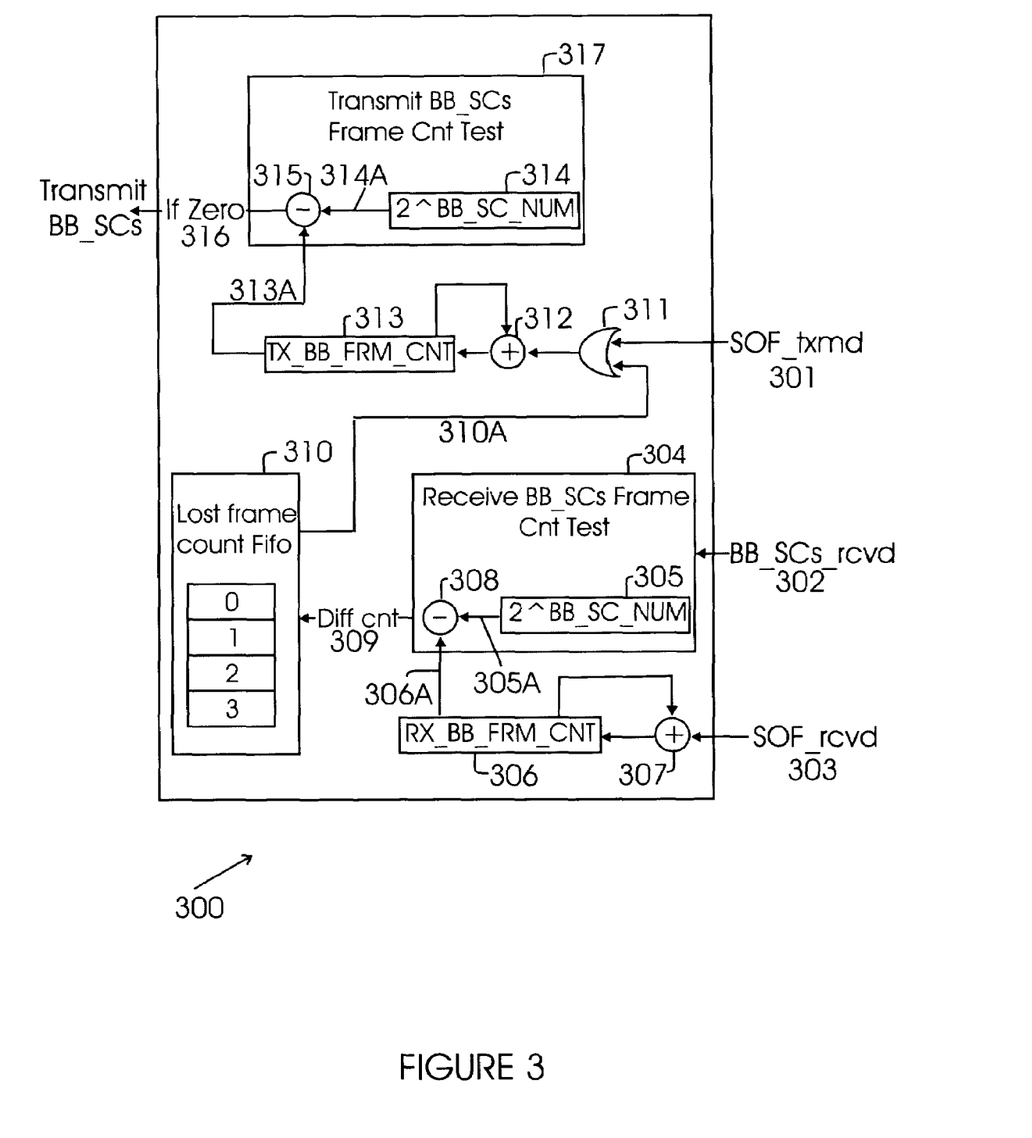
FIG. 3 is a system diagram showing how BB_SCs are handled, according to one aspect of the present invention.
Figure 4:
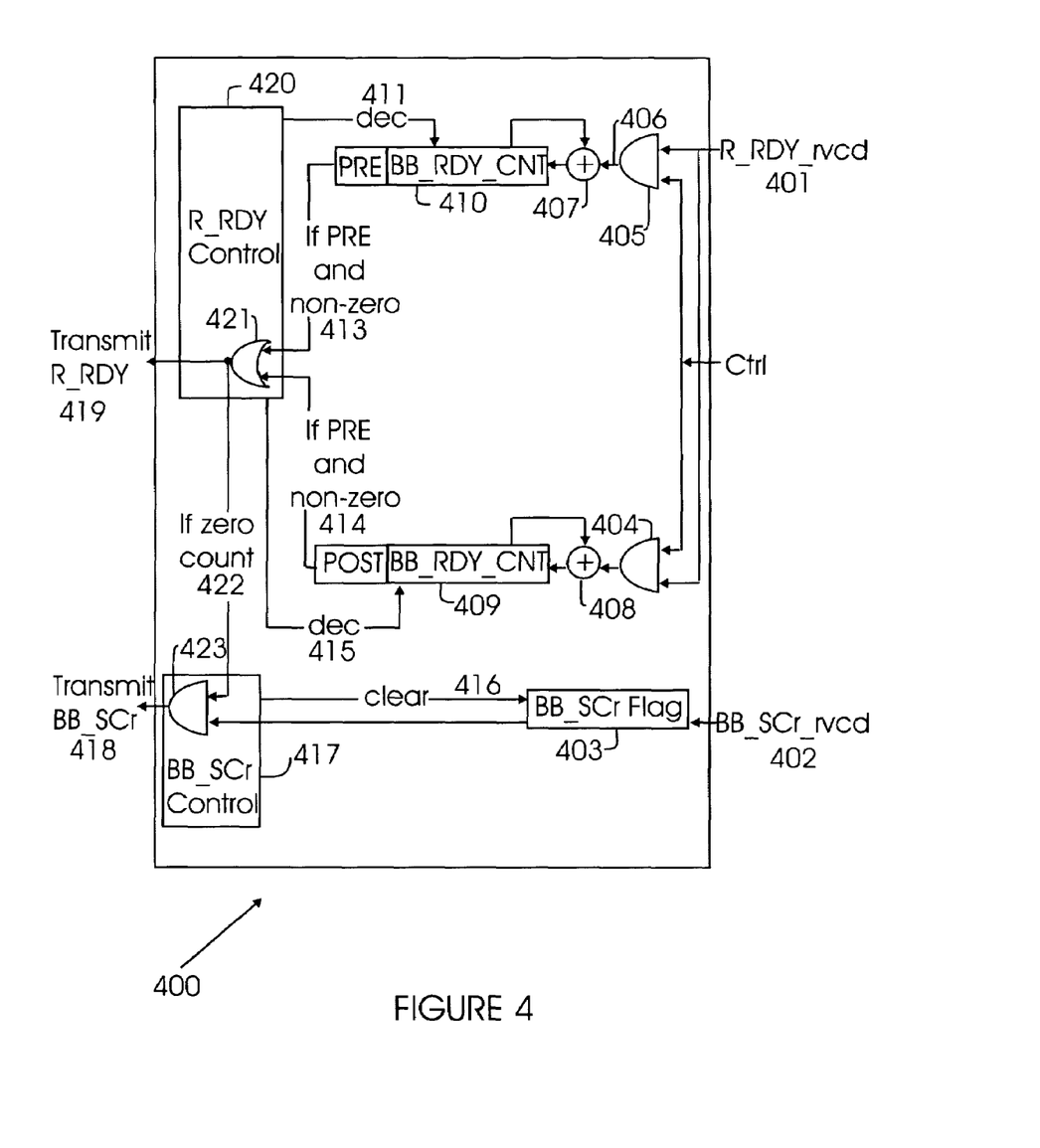
FIG. 4 is a block diagram showing how BB_SCrs are handled, according to one aspect of the present invention.

FIGS. 3 and 4 describe how the receive and transmit side operate in managing BB_SCs and BB_SCrs, according to one aspect of the present invention. The systems shown in FIGS. 3 and 4 are located in buffer to buffer credit recovery module 216.

As stated above, BB_SCs are sent periodically by remote device 201 to local device 221 via credit extender 200A. In one aspect of the present invention, this allows the local device 221 and remote device 201 to be in sync.

FIG. 3 shows a block diagram of system 300 that handles BB_SCs. BB_SCs 302 and SOF_rcd 303 (Start of Frame) are received from device 201. BB_SCs are received by module 304 that includes a counter 305 that can be programmed/hardcoded by firmware. SOF_rcd 303 is counted by counter 306. Values 305A and 306A from counters 305 and 306, respectively, are compared when BB_SCs are received. If 305A and 306A match, then the difference 309 is zero. If the values do not match, then the difference 309 is sent to FIFO 310 (lost frame count FIFO).

Value 310A is added to counter 313 that counts the SOF of transmitted frames provided by 301.

Counter 313 output value 313A is compared to counter 314's output 314A. If there is a match, then BB_SCs 316 are sent out to local device 221. If there is no match, BB_SCs are not sent out to local device 221.

It is noteworthy that counters 314 and 305 are similar and set to the same value.

The following summarizes the FIG. 3 system operation:
Receive Side:
If BB_SC_NUM 305 is set to a non-zero value, perform the following:
After receiving each frame, increment RX_BB_FRM_CNT register 306 by one. If RX_BB_FRM_CNT equals 2^BB_SC_NUM, set RX_BB_FRM_CNT 306 to zero.
When BB_SCs primitive is received, the number of BB_Credits lost is calculated using the following:
BB_Credits lost=(2^BB_SC_NUM−RX_BB_FRM_CNT) mod 2^BB_SC_NUM
For each BB_Credit lost, increment the TX_BB_FRM_CNT register 313 by one.
Thereafter:
Set RX_BB_FRM_CNT 306 to zero.
Transmit Side:
If BB_SC_NUM 314 is set to a non-zero value, perform the following:
After transmitting each frame, increment TX_BB_FRM_CNT register 313 by one.
Send BB_SCs primitive 316 if TX_BB_FRM_CNT 313A equals 2^BB_SC_NUM 314A.
If TX_BB_FRM_CNT 313 equals 2^BB_SC_NUM 314, set TX_BB_FRM_CNT 313 to zero.

FIG. 4 shows system 400 for handling BB_SCrs, according to one aspect of the present invention. R_RDYs 401 are received from remote device 201 and are counted by counter 410 before BB_SCr 403 is received. When BB_SCr 403 is received, a BB_SCr flag is set in register 403 (also referred to Bb_SC_RDY register), which indicates that a BB_SCr needs to be sent to local device 221. The following describes how BB_SCrs are handled, according to one aspect of the present invention.

(a) R_RDY 401 are received and counted by counter 410 and when counter 410 value 413 is non-zero, an R_RDY 419 is sent out by R_RDY control module 420. After R_RDY 419 is sent out, counter 410 is decremented by one.

(b) When BB_SCr 402 is received, BB_SCr flag is set in register 403, which indicates that a BB_SCr needs to be sent. BB_SCr 418 are sent out when counter 410 value is zero, as shown by signal 422, thereafter, counters 410 and 409 are flipped.

(c) If an R_RDY 401 is received after BB_SCr 402 is received, then counter 409 counts R_RDYs, i.e. the counting of R_RDY flips from counter 410 to counter 409. R_RDY 419 is sent when 414 is non-zero and the process continues.

The following is a summary of the foregoing steps:
(i) After receiving each R_RDY 401,
if BB_SC_RDY 403 is clear, increment PRE_BB_RDY_CNT register 410 by one.
if BB_SC_RDY 403 is set, increment POST_BB_RDY_CNT register 409 by one.
(ii) When a BB_SCr primitive 402 is received, set the BB_SCr flag in register 403.
The register 403 flag is cleared (signal 416) when a BB_SCr 418 is transmitted.
(iii) Send BB_SCr primitive 418 if PRE_BB_RDY_CNT 410 is zero and BB_SC_RDY flag (register 403) is set.
(iv) Clear the BB_SC_RDY register 403 flag.
(v) Change the state of the BB_RDY_CNT counters (i.e. (flip counter 410 and 409).
(vi) Send R_RDY 419 if PRE_BB_RDY_CNT is non zero (i.e. value 413 is non zero).

Figure 5:
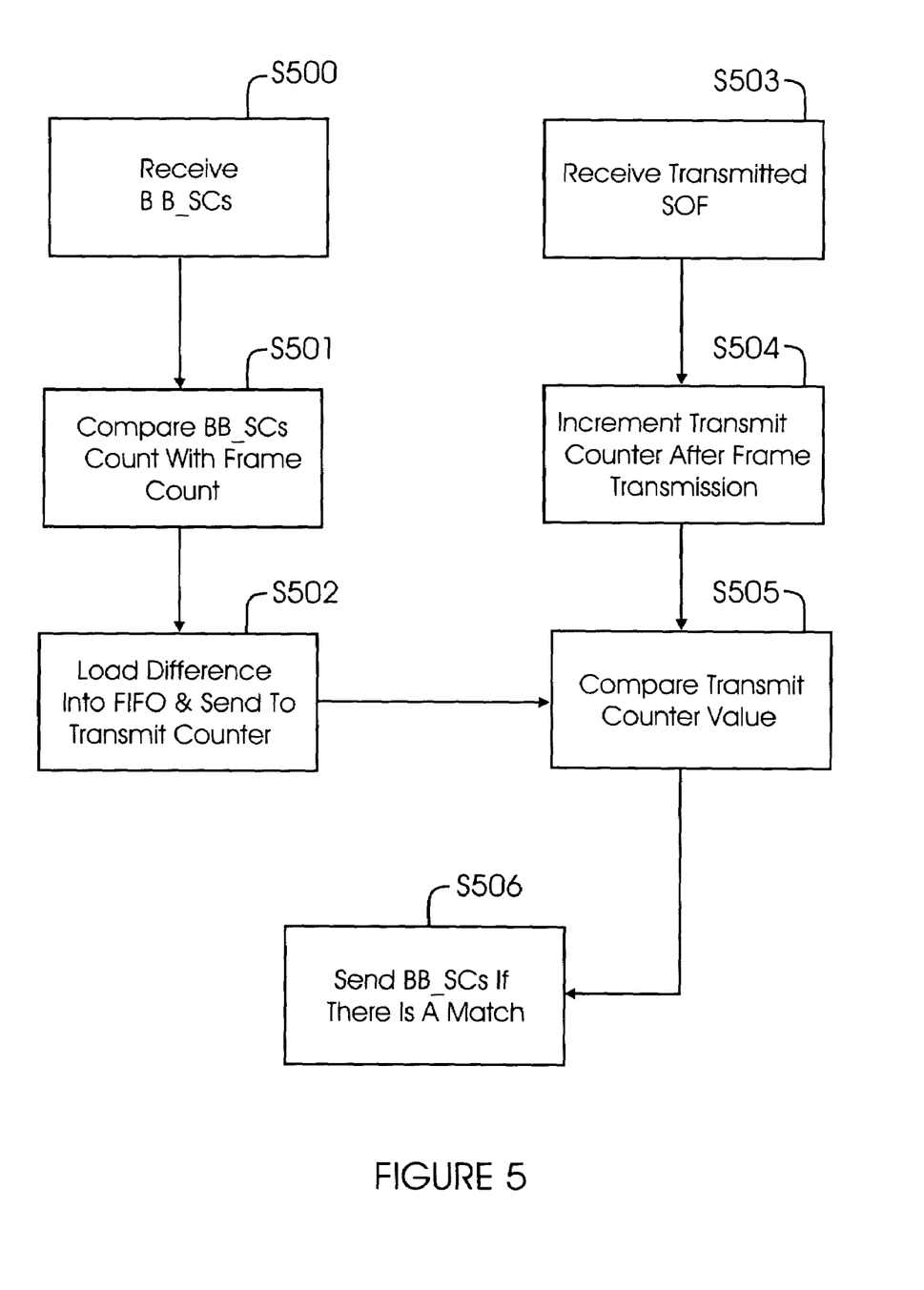
FIG. 5 is a flow diagram for handling BB_SCs, according to one aspect of the present invention.

FIG. 5 is a flow diagram of executable process steps for handling BB_SCs. It is noteworthy that steps S500-S502 and S503-S505 occur simultaneously.

Turning in detail to FIG. 5, in step S500, BB_SCs 302 are received from remote device 201 with frame count 303.

In step S501, counter 305 and 306 values are compared. In step S502, the difference between values 305A and 306A is loaded into FIFO 310.

In step S503, the SOF count on the transmit side 301 is received.

In step S504, transmit counter 313 is incremented after each frame transmission. The difference between values 305A and 306A is sent to counter 313.

In step S505, transmit counter value is compared with counter 314 value. If there is a match, then in step S506, BB_SCs 316 are sent to local device 221.

Figure 6:
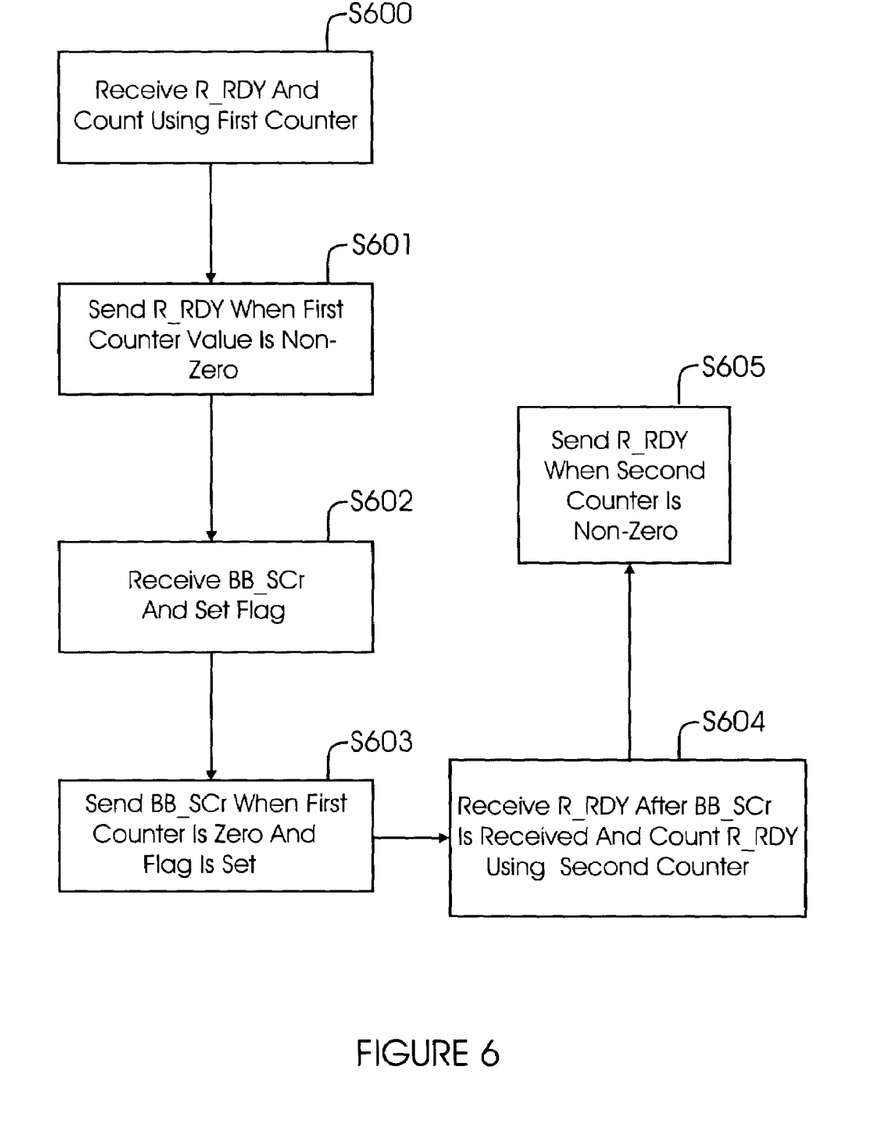
FIG. 6 is a flow diagram for handling BB_SCrs, according to one aspect of the present invention.

FIG. 6 is a flow diagram of executable process steps for handling BB_SCrs, according to one aspect of the present invention.

In step S600, R_RDYs 401 are received and counted by counter 410.

In step S601, R_RDYs 419 are transmitted by R_RDY control module when counter 410 value 413 is non-zero. When an R_RDY is transmitted, counter 410 is decremented (see signal (or command) 411).

In step S602, BB_SCrs 402 are received. A flag is set at register 403 that indicates that a BB_SCr needs to be sent out.

In step S603, BB_SCr 418 is sent out by BB_SCr control module 417 when counter 410 is zero and the flag in register 403 is set. Register 403 is cleared when BB_SCr is sent (see signal 416)

In step S604, R_RDYs 401 are received after BB_SCrs are received. R_RDYs 401 are now counted by counter 409.

In step S605, R_RDYs 419 are sent when counter 409 value 414 is non-zero. When an R_RDY is sent out, counter 409 is decremented (see signal 415).

In one aspect of the present invention, the local device is in sync with the remote device, and credit management occurs efficiently.

Although the present invention has been described with reference to specific embodiments, these embodiments are illustrative only and not limiting. Many other applications and embodiments of the present invention will be apparent in light of this disclosure and the following claims.

What is claimed is:

1. A method for credit recovery due to lost frames in an in-line credit extender coupled between a remote device and a local device, where the in-line credit extender extends credit for the local device, comprising:

determining credit loss due to lost frames by comparing a frame count value with a primitive count value for a receive segment of the in-line credit extender, the primitive count value being maintained in a buffer to buffer credit recovery module of the in-line credit extender, the buffer to buffer credit recovery module interfacing with the receive segment of the in-line extender that receives frames and primitives from the remote device and a transmit segment of the in-line extender that transmits frames and primitives to the remote device, wherein a primitive is sent periodically by the remote device after certain number of frames are transmitted by the remote device to the local device via the in-line extender, wherein the credit loss is a difference between the frame count value and the primitive count value for the receive segment of the in-line credit extender;

storing the credit loss in a buffer at the buffer-to-buffer credit recovery module in the in-line extender;

increasing a transmit frame count based on the credit loss, the transmit frame count is maintained for frames that are transmitted by the in-line extender to the local device and the transmit frame count is maintained by a counter in the buffer to buffer credit recovery module; and sending the primitive to the local device if the transmit flame count after adding the credit loss matches a primitive count maintained for the transmit segment of the in-line extender by the buffer-to-buffer recovery module.

2. The method of claim 1, wherein a counter for the primitive count for the receive segment of the in-line extender and a counter for the primitive count for the transmit segment of the in-line credit extender are set to a same value.

3. The method of claim 1, wherein the in-line extender is used in a Fibre Channel network.

4. The method of claim 3, wherein the primitive is a flow control Fibre Channel compliant primitive, BB-SC, used for recovering credit due to loss of frames.

5. The method of claim 1, wherein the in-line credit extender is coupled to a host bus adapter.

6. The method of claim 1, wherein the in-line credit extender is coupled to a switch.

7. A system for credit recovery due to lost frames in an in-line credit extender coupled between a remote device and a local device, the in-line credit extender extending credit for the local device, comprising:

a first counter in a buffer to buffer credit recovery module of the in-line extender, for counting frames received by a receive segment of the in-line extender from the remote device;

a first programmable counter for the receive segment of the in-line credit extender that is programmed with a value;

a comparator for comparing a first counter value of the first counter and the first programmable counter value when a primitive is received from the remote device, wherein the primitive is sent periodically by the remote device after certain number of frames are transmitted by the remote device to the local device via the in-line extender;

a buffer for storing the difference between the first counter value and the programmable counter value, the difference indicating credit loss due to loss of frames;

a second counter for counting frames transmitted by a transmit segment of the in-line credit extender; where a second counter value of the second counter is increased by the difference between the first counter value and the second counter value; and a second programmable counter for a primitive count for the transmit segment of the in-line credit extender, whose value is compared to the second counter value and if there is a match between the second programmable value and the second counter value, then the transmit segment of the in-line extender sends the primitive to the local device.

8. The system of claim 7, wherein the first programmable counter and the second programmable counter are set to a same value.

9. The system of claim 8, wherein the in-line extender is used in a Fibre Channel network.

10. The system of claim 9, wherein the primitive is a flow control Fibre Channel compliant primitive, BB_SC, used for recovering credit due to loss of frames.

11. The system of claim 7, wherein the in-line credit extender is coupled to a host bus adapter.

12. The system of claim 7, wherein the in-line credit extender is coupled to a switch.

13. A method for credit recovery in an in-line credit extender due to loss of a first primitive used for establishing credit, the in-line credit extender being operationally, coupled between a remote device and a local device for extending credit for the local device, comprising:

receiving the first primitive, wherein the in-line extender receives the first primitive from the remote device;

counting the first primitive using a first counter in a buffer to buffer credit module of the in-line credit extender;

sending the first primitive from the in-line credit extender to the local device, if a first counter value of the first counter is non-zero;

receiving a second primitive from the remote device, the second primitive sent periodically by the remote device after sending one or more of the first primitive;

setting a flag when the second primitive is received;
transmitting the second primitive to the local device when the first counter value is zero and the flag is set; and
counting one or more of the first primitive that are received after receiving the first primitive using a second counter instead of the first counter.

14. The method of claim 13, further comprising:
transmitting one or more of the first primitive when a second counter value of the second counter is non-zero.

15. The method of claim 14, wherein the second counter is decremented after the first primitive is transmitted.

16. The method of claim 13, wherein the first counter value is decreased after the first primitive is transmitted.

17. The method of claim 13, wherein the flag is cleared after the second primitive is transmitted.

18. The method of claim 13, wherein the first primitive is R_RDY, a flow control primitive used in a Fibre Channel network to establish credit; and the second primitive is BB_SCr sent periodically by a Fibre Channel device for credit recovery due to loss of R_RDYs.

19. A system for credit recovery in an in-line credit extender, due to loss of a first primitive used for establishing credit, the in-line credit extender being operationally coupled between a remote device and a local device for extending credit for the local device, comprising:
a first counter for counting the first primitive;
a second counter for counting one or more of the first primitive that are received after the in-line credit extender receives a second primitive, the second primitive is periodically sent by the remote device for credit recovery due to loss of the first primitive;
a register that stores a flag, where the flag is set after the second primitive is received; and
a first primitive control module that transmits the first primitive to the local device when a first counter value of the first counter is non-zero or transmits the first primitive to the local device if the second counter is non-zero, when the second counter is used for counting the first primitive.

20. The system of claim 19, further comprising:
a second primitive control module that transmits the second primitive when the first or second counter value is zero and the register flag is set.

21. The system of claim 19, wherein the first primitive is R_RDY, a flow control primitive used in a Fibre Channel network to establish credit; and the second primitive is BB_SCr sent periodically by a Fibre Channel device for credit recovery due to loss of R_RDYs.

22. The system of claim 19, wherein the in-line credit extender is coupled to a host bus adapter.

23. The system of claim 19, wherein the in-line credit extender is coupled to a switch.

* * * * *

UNITED STATES PATENT AND TRADEMARK OFFICE
CERTIFICATE OF CORRECTION

| | | |
|---|---|---|
| PATENT NO. | : 7,352,701 B1 | Page 1 of 1 |
| APPLICATION NO. | : 10/664548 | |
| DATED | : April 1, 2008 | |
| INVENTOR(S) | : James A. Kunz | |

It is certified that error appears in the above-identified patent and that said Letters Patent is hereby corrected as shown below:

In column 7, line 57, in claim 1, delete "flame" and insert -- frame --, therefor.

In column 8, line 55, in claim 13, delete "operationally," and insert -- operationally --, therefor.

In column 10, line 15, in claim 20, after "the first" delete "or second".

Signed and Sealed this

Ninth Day of November, 2010

David J. Kappos
*Director of the United States Patent and Trademark Office*